Patented Nov. 23, 1937

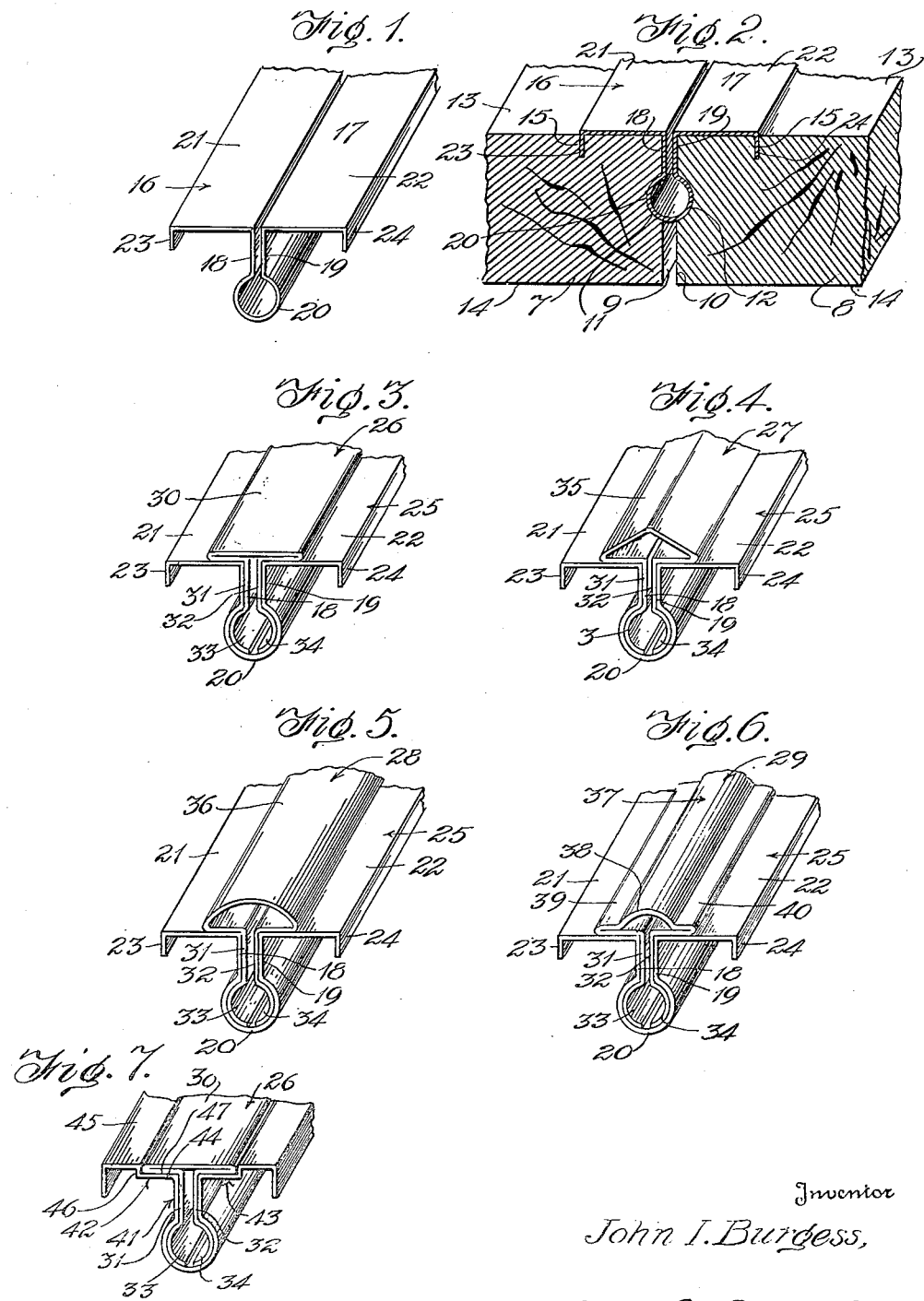

2,100,238

UNITED STATES PATENT OFFICE 2,100,238

METALLIC EXPANSION JOINT

John I. Burgess, Fort Worth, Tex.

Application April 8, 1936, Serial No. 73,366

2 Claims. (Cl. 20—6)

This invention relates to a metallic expansion joint designed primarily for use in connection with the wooden body sections of boats, liquid containers and building walls, but it is to be understood that an expansible joint, in accordance with this invention, is to be employed in any connection for which it may be found applicable, and the invention has for its object to provide, in a manner as hereinafter set forth, a leak proof expansible joint for the body sections of a structure which expand and contract due respectively to wet and dry climatic conditions.

A further object of the invention is to provide, in a manner as hereinafter set forth, an expansible leak proof joint for the purpose referred to, including a cover to enhance the appearance thereof, as well as to reduce to a minimum the entrance of foreign matter into the body of the joining member.

Further objects of the invention are to provide, in a manner as hereinafter set forth, a metallic expansion joint for the purpose referred to which is simple in its construction and arrangement, strong, durable, formed of non-corrosive metallic material, thoroughly efficient in its use, readily installed with respect to the sections of a structure for joining them together and inexpensive to manufacture.

With the foregoing and other objects in view, the invention consists of the novel construction, combination and arrangement of parts as will be more specifically referred to and are as illustrated in the accompanying drawing, but it is to be understood that changes, variations and modifications may be resorted to which fall within the scope of the invention as claimed.

In the drawing:

Figure 1 is a fragmentary view in perspective of a metallic expansible joint in accordance with this invention, Figure 2 is a cross sectional view of the joint showing the adaptation thereof with respect to a pair of wooden body sections of a structure, Figure 3 is a fragmentary view in transverse section of a modified form of expansion joint in accordance with this invention, and Figures 4, 5, 6 and 7 are fragmentary views in perspective of still other modified forms of expansion joints in accordance with this invention.

The joint, in accordance with this invention, is designed primarily for use in connection with a pair of body sections of a wooden structure and it is so shown in Figure 2, but it is to be understood that the body sections with which the joint is used may be of other material than wood, and with reference to Figure 2, a pair of wooden body sections is indicated at 7, 8. The said sections are arranged in edgewise opposed relation and the opposed edges 9, 10 of the body sections 7, 8 are formed with oppositely disposed semi-circular aligning grooves 11, 12 respectively spaced from the inner and outer faces 13, 14 respectively. The section 7, as well as the section 8, is formed in its outer or inner face with a lengthwise extending groove and, as shown, such groove, indicated at 15, is formed by way of example in the outer face 13. The groove 15 is disposed in parallelism to an edge 9 or an edge 10 and positioned in proximity to the latter.

The metallic joint, in accordance with this invention, which is employed to provide a leak proof expansible joint between the sections 7, 8, is generally indicated at 16 and it is constructed from a continuous strip 17 of spring metal of the desired width and length and such strip is termed a jointing element. The strip 17 is bent upon itself in a manner to provide an anchoring part in the form of a split bulbous tubular portion 20 at the bend of the strip, a pair of upwardly extending parallel spaced straight stems 18, 19 merging at their inner ends into the split ends of the portion 20, a pair of oppositely disposed outwardly extending flat wings 21, 22 merging at their inner sides in the outer ends of and disposed at right angles to the stems 18, 19 and a pair of downturned vertical straight anchoring flanges 23, 24 merging at their upper ends in the outer sides of the wings 21, 22 and disposed parallel to the stems 18, 19. The wings have their inner and outer upper corners sharp. The outer faces of the stems form broad bearing surfaces for the upper portion of the edges 9, 10 of the sections 7, 8. The inner faces of the wings form broad seating surfaces therefor when mounted on the upper faces 13 of sections 7, 8.

When the jointing element is set up relative to the sections 7, 8, the portion 20 is arranged within and has its outer periphery throughout snugly engage the walls of the grooves 11, 12, the stems 18, 19 have their outer faces throughout snugly engage the upper portions of the edges 9, 10 of the sections 7, 8 and extend from the portion 20 to the outer faces 13, 14 of the sections 9, 10, the wings 21, 22 have their lower faces throughout seat against the outer faces 13 of the sections 7, 8 and the flanges 23, 24 throughout snugly engage the walls of the grooves 15 whereby the sections 7, 8 are jointed together in parallel spaced relation. The portion 20 in connection with the parallel spaced stems 18, 19 coact to maintain the sections 7, 8 in parallel spaced relation. The grooves 11, 12, 15 in connection with the portion 20 and flanges 23, 24 coact to provide for securing the jointing element to the sections 7, 8. The flanges act to prevent moisture from the outer surfaces 13, 14 of the sections from entering between the wings and said sections.

The stems 18, 19, wings 21, 22 and flanges 23, 24 of the jointing element bodily shift with the sections 7, 8 on the contraction and expansion of said sections and at the same time the loop 20 will provide a seal between the sections 7, 8 whereby the jointing element will provide at all times an expansible leak proof joint between said body sections.

With reference to Figures 3, 4, 5 and 6, the jointing element, indicated at 25, is of the same construction as the jointing element shown in Figure 1, and element 25 is arranged relative to the body sections in the same manner as the jointing element shown in Figure 2. The element 25, shown in Figure 3, has connected thereto a cover element 26. The jointing element 25, shown in Figure 4, has connected therewith a cover element 27. The jointing element, shown in Figure 5, has connected therewith a cover element 28 and the jointing element 25, shown in Figure 6, has connected therewith a cover element 29. The cover element 29 is of T-shape contour and comprises a flat head 30, a pair of spaced straight parallel stems 31, 32 which merge at their outer ends into the head 30 and at their inner ends merge into a pair of oppositely disposed semi-circular anchoring parts 33, 34 offset laterally with respect thereto. The stems 31, 32 are of greater length than the stems 18, 19.

When the cover element 29 is arranged relative to the jointing element, the stems 31, 32 are arranged between the stems 18, 19 with the outer faces of the stems 31, 32 frictionally binding against and throughout the inner faces of the stems 18, 19. The anchoring parts 33, 34 are extended into the portion 20 of the jointing element and have their outer faces throughout frictionally bind against the inner face of the said portion 20. When the jointing element expands or contracts the stems 31, 32 and parts 33, 34 move therewith.

As the stems 18, 19, 31 and 32 are straight a frictional binding surface of greater area is had between them than would be the case if the stems 31, 32 were of angled contour or curved or if the stems 18, 19 were inclined and the stems 31, 32 of angled contour or curved.

The cover element 27 is of the same construction as the cover element 26, with the exception that the head 35 of the element 27 is of substantially triangular contour. The cover element 28 is of the same construction as the cover element 26 with the exception that the head 36 of element 28 is substantially of semi-ovoidal contour. The cover element 29 is of the same construction as the cover element 26 with the exception that the head 37 of element 29 is formed with a raised center portion 38 of segmental cross section and which merges into oppositely extending flat portions 39, 40.

The cover elements 27, 28 and 29 are each connected to a jointing element 25 in the same manner as the cover element 26 is connected to the jointing element.

The cover elements 26 to 29 are split and each is formed from a continuous length of suitable material bent upon itself to provide the head, stems and anchoring parts thereof. The head of a cover element is formed at the bend of the top. The spaced parallel portions of each cover element which extend from the head thereof are resilient for the purpose of frictionally binding against the stems and bulbous portion of the jointing element.

The cover elements 26 to 29, both inclusive, act to enhance the appearance of an expansible leak proof joint in accordance with this invention and further act to arrest the entrance of foreign matter between the stems 18, 19 of the jointing element as well as into the loop 20 of the jointing element.

With reference to Figure 7, the joint includes a strip 41 of spring metal bent in the same manner as the strip 17 with the exception that the wings 42, 43 thereof, which correspond to the wings 21, 22, are formed of inner and outer stretches 44, 45 respectively connected together by the flanges 46. The wings 42, 43 coact to provide a countersink 47 which is to receive the head 30 of the cover element 25. This arrangement provides for a flush cover.

What I claim is:

1. In an expansible leak proof joint, the combination with a pair of spaced, parallel inner side edgewise aligned body sections of a structure, said sections being formed in opposed side edges with aligning oppositely disposed semi-circular grooves intermediate the upper and lower ends of said edges, said sections being formed in their upper faces with grooves adjacent and parallel to said side edges, and a continuous jointing element provided at its inner end with an anchoring part in the form of a split bulbous tubular portion having its outer face snugly engaging throughout the walls of said semi-circular grooves, a pair of vertically disposed spaced parallel stems merging at their lower ends into the split ends of said portion and having their outer faces bearing throughout against said side edges from the top of said portion to the upper end of said edges, a pair of oppositely disposed outwardly extending flat wings merging at their inner sides into the outer ends of and disposed at right angles to said stems, the inner faces of said wings seating throughout upon the upper face of said sections, and a pair of downturned vertical straight flanges integral at their upper ends with the outer sides of said wings and extending into said grooves in the upper faces of said sections.

2. The invention as set forth in claim 1 having combined therewith a cover element for said jointing element, said cover element consisting of a continuous strap of resilient material bent upon itself to provide a split head at its bend, a pair of depending spaced straight vertical parallel stems integral at their upper ends with the split ends of the head and a pair of oppositely extending anchoring parts integral with the lower ends of the stems of the cover element and offset with respect to such stems, the stems of said cover element being arranged between and having their outer faces frictionally binding against throughout the inner faces of the other of said stems, the anchoring parts of said cover element extending into said bulbous portion and having their outer faces frictionally binding throughout against the inner face of said portion, and said head seated upon said wings.

JOHN I. BURGESS.